United States Patent
Morita

(10) Patent No.: US 11,167,636 B2
(45) Date of Patent: Nov. 9, 2021

(54) GRILLE SHUTTER CONTROL DEVICE

(71) Applicant: TOYODA GOSEI CO., LTD., Kiyosu (JP)

(72) Inventor: Bunpei Morita, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 160 days.

(21) Appl. No.: 16/505,790

(22) Filed: Jul. 9, 2019

(65) Prior Publication Data

US 2020/0039346 A1 Feb. 6, 2020

(30) Foreign Application Priority Data

Jul. 31, 2018 (JP) ............................. JP2018-143368

(51) Int. Cl.
*B60K 11/08* (2006.01)
*F01P 7/10* (2006.01)

(52) U.S. Cl.
CPC ............. *B60K 11/085* (2013.01); *F01P 7/10* (2013.01)

(58) Field of Classification Search
CPC ......... B60K 11/04; B60K 11/05; B60K 11/08; B60K 11/085; B60R 19/52; B60R 2019/525; F01P 7/10
See application file for complete search history.

(56) References Cited

U.S. PATENT DOCUMENTS

| 8,662,569 | B2 * | 3/2014 | Klop | ................... | B60K 11/085 296/193.1 |
| 8,689,917 | B2 * | 4/2014 | Miesterfeld | ............... | F01P 7/10 180/68.1 |
| 9,174,527 | B2 * | 11/2015 | Hayakawa | ........... | B60K 11/085 |
| 9,447,719 | B2 * | 9/2016 | Kiener | .................... | F28F 27/02 |
| 2006/0095178 | A1 * | 5/2006 | Guilfoyle | ............. | B60K 11/085 701/36 |
| 2011/0048691 | A1 | 3/2011 | Shin et al. | | |

(Continued)

FOREIGN PATENT DOCUMENTS

DE 10 2012 010 891 A1 12/2013
FR 2 942 748 A1 9/2010

(Continued)

OTHER PUBLICATIONS

Extended European Search Report dated Jan. 7, 2020 issued in corresponding EP patent application No. 19188401.4.

(Continued)

*Primary Examiner* — Emma K Frick
(74) *Attorney, Agent, or Firm* — Posz Law Group, PLC

(57) ABSTRACT

A grille shutter control device is employed for a grille shutter that includes a frame, which is provided in a front grille of a vehicle and has an outside air inlet, and an opening-closing unit for opening and closing the outside air inlet. The grille shutter control device controls an opening-closing operation of the opening-closing unit such that the outside air inlet is opened or closed in accordance with a condition of the vehicle. The grille shutter controller includes an actuator and a controlling section. The actuator performs an anti-sticking operation for preventing the opening-closing unit from being stuck. The controlling section controls the actuator such that the anti-sticking operation is periodically performed by the actuator.

6 Claims, 7 Drawing Sheets

(56) References Cited

U.S. PATENT DOCUMENTS

| | | | |
|---|---|---|---|
| 2013/0086839 A1 | 4/2013 | Klop | |
| 2013/0223980 A1* | 8/2013 | Pastrick | F01D 5/00 |
| | | | 415/1 |
| 2013/0268164 A1* | 10/2013 | Sugiyama | B60K 11/085 |
| | | | 701/49 |
| 2014/0090610 A1* | 4/2014 | Higuchi | B60K 11/085 |
| | | | 123/41.58 |
| 2014/0230760 A1 | 8/2014 | Okamoto | |

FOREIGN PATENT DOCUMENTS

| | | | |
|---|---|---|---|
| JP | 2014-069789 A | 4/2014 | |
| JP | 2014-069790 A | 4/2014 | |
| JP | 2014-159250 A | 9/2014 | |
| JP | 2015-093665 A | 5/2015 | |

OTHER PUBLICATIONS

Notice of Reasons for Refusal dated Aug. 3, 2021 issued in corresponding JP application No. 2018-143368 (and English translation).

* cited by examiner

GRILLE SHUTTER CONTROL DEVICE

BACKGROUND

1. Field

The present disclosure relates to a grille shutter control device.

2. Description of Related Art

The front grille of a vehicle such as an automobile is designed to supply outside air for cooling the radiator. Some vehicle front grilles are equipped with a grille shutter for preventing excessive cooling of the radiator.

Such a grille shutter includes a frame, which is provided in the front grille of a vehicle and has outside air inlets, and opening-closing units for opening and closing the outside air inlets. The grille shutter is controlled by a computer mounted on the vehicle. Then, the computer acquires the condition of the vehicle based on detection signals from various types of sensors and controls the opening-closing operation of the opening-closing units so as to open or close the outside air inlets in accordance with the acquired condition.

For example, when the outside air temperature is low, the opening-closing operation of the opening-closing units is performed to close the outside air inlets, so that the radiator will not be cooled excessively by the outside air. When the outside air temperature is high, the opening-closing operation of the opening-closing units is operated to open the outside air inlets, so that the radiator will be effectively supplied with cooling outside air.

Japanese Laid-Open Patent Publication No. 2014-69790 discloses a configuration in which opening-closing units are urged toward the open position by a spring, and the opening-closing operation of the opening-closing unit is performed in this state. In this case, when it is impossible to perform the opening-closing operation of the opening-closing units based on control of the computer due to a failure of the computer, the opening-closing units are held at the open position by the urging force of the spring. Therefore, when the opening-closing operation of the opening-closing units cannot be performed, the outside air is not prevented from being introduced through the outside air inlets, so that cooling of the radiator by the outside air will not be insufficient.

In a grille shutter, ice, mud, or the like clogs the gaps between the frame and the opening-closing units, so that the opening-closing units may be stuck open or closed. When the opening-closing units are stuck as in these cases, the outside air may excessively or insufficiently cool the radiator.

Even if the opening-closing units are always urged to the open position by the spring described in the above-mentioned publication, there is a limit in the setting of increase in the urging force of the spring. Thus, when the opening-closing units are stuck closed, the urging force of the spring will not necessarily cancel the sticking of the opening-closing units.

SUMMARY

Accordingly, it is an objective of the present disclosure to provide a grille shutter control device that prevents opening-closing units from being stuck.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a grille shutter control device is provided. The grille shutter control device is employed for a grille shutter that includes a frame, which is provided in a front grille of a vehicle and has an outside air inlet, and an opening-closing unit for opening and closing the outside air inlet. The grille shutter control device controls an opening-closing operation of the opening-closing unit such that the outside air inlet is opened or closed in accordance with a condition of the vehicle. The grille shutter control device includes an actuator that performs an anti-sticking operation for preventing the opening-closing unit from being stuck, and a controlling section that controls the actuator such that the anti-sticking operation is periodically performed by the actuator.

Other features and aspects will be apparent from the following detailed description, the drawings, and the claims.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A grille shutter control device according to a first embodiment will now be described with reference to FIGS. 1 to 6.

Figure 1:
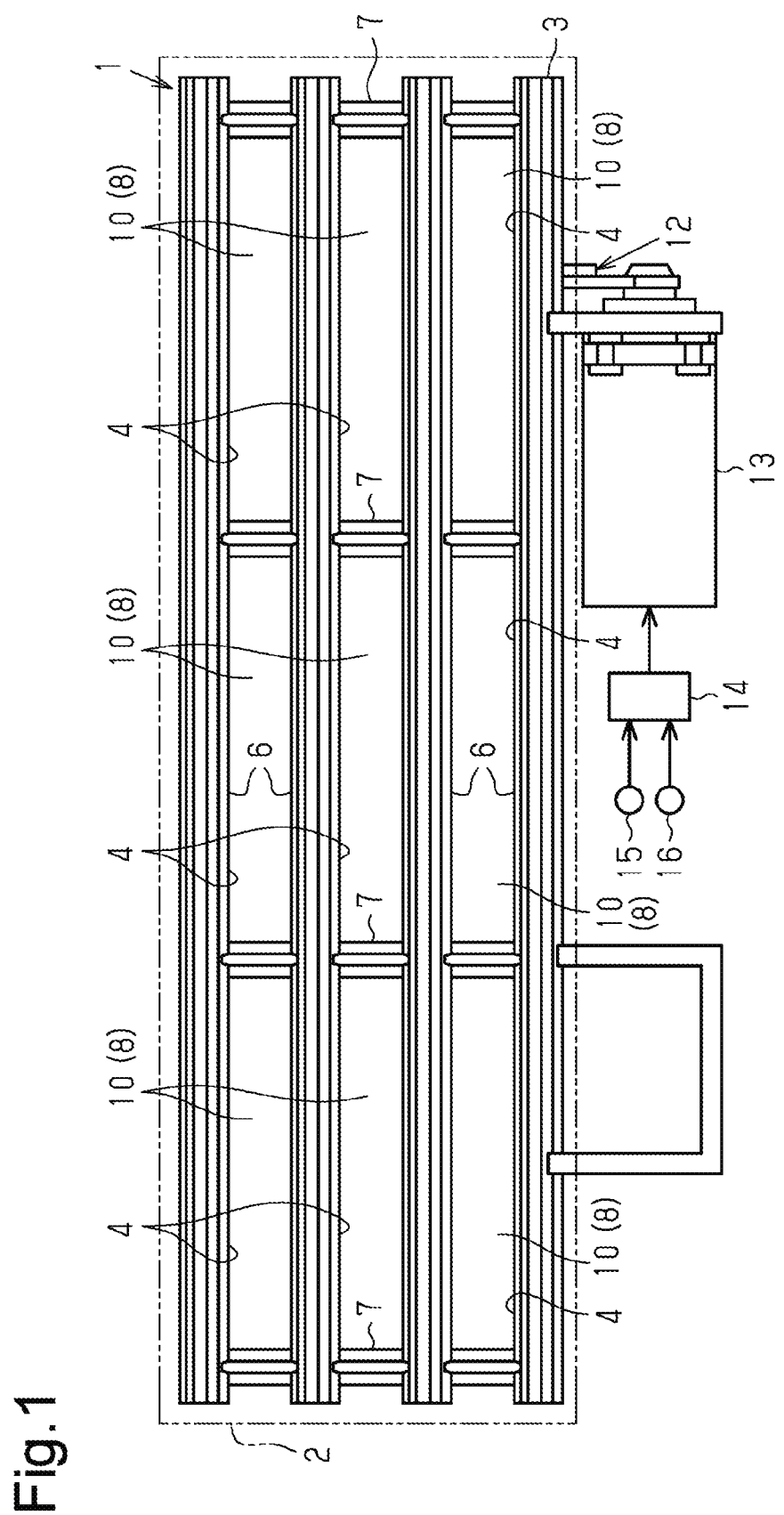
FIG. 1 is a front view showing a closed state of a grille shutter according to a first embodiment.
Figure 2:
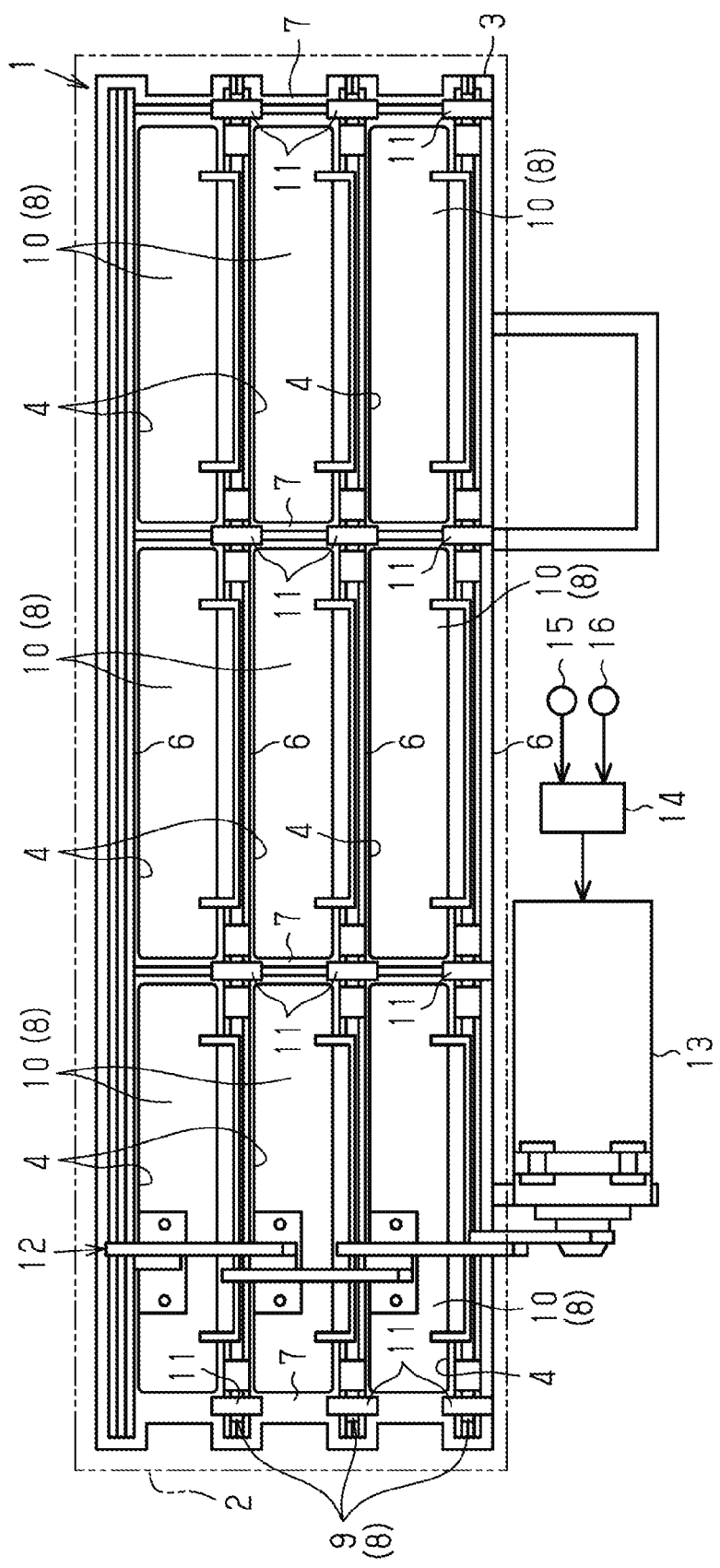
FIG. 2 is a rear view showing the closed state of the grille shutter.

FIGS. 1 and 2 show a grille shutter 1 as seen from the front and rear of a vehicle, respectively. The grille shutter 1 includes a rectangular frame 3 provided in a front grille 2 of the vehicle. The frame 3 has horizontal bars 6 and vertical bars 7. The horizontal bars 6 extend in the horizontal direction to be parallel with each other. The vertical bars 7 extend in the vertical direction to be parallel with each other. The horizontal bars 6 and the vertical bars 7 define outside air inlets 4 in the frame 3.

The grille shutter 1 has opening-closing units 8 for opening and closing the outside air inlets 4. Specifically, as shown in FIG. 2, three opening-closing units 8 are arranged in line in the vertical direction. Each opening-closing unit 8 has a shaft 9 extending horizontally along the corresponding horizontal bar 6 and shielding plates 10 that are fixed to the shaft 9 and positioned in correspondence with the outside air inlets 4 above the shaft 9. That is, the shielding plates 10 that constitute each opening-closing unit 8 are arranged in line in the horizontal direction. The horizontal bars 6 include bearing portions 11. Each shaft 9 is supported by the bearing portions 11 of the corresponding horizontal bar 6 so as to be rotational around the center line of the shaft 9.

Figure 3:
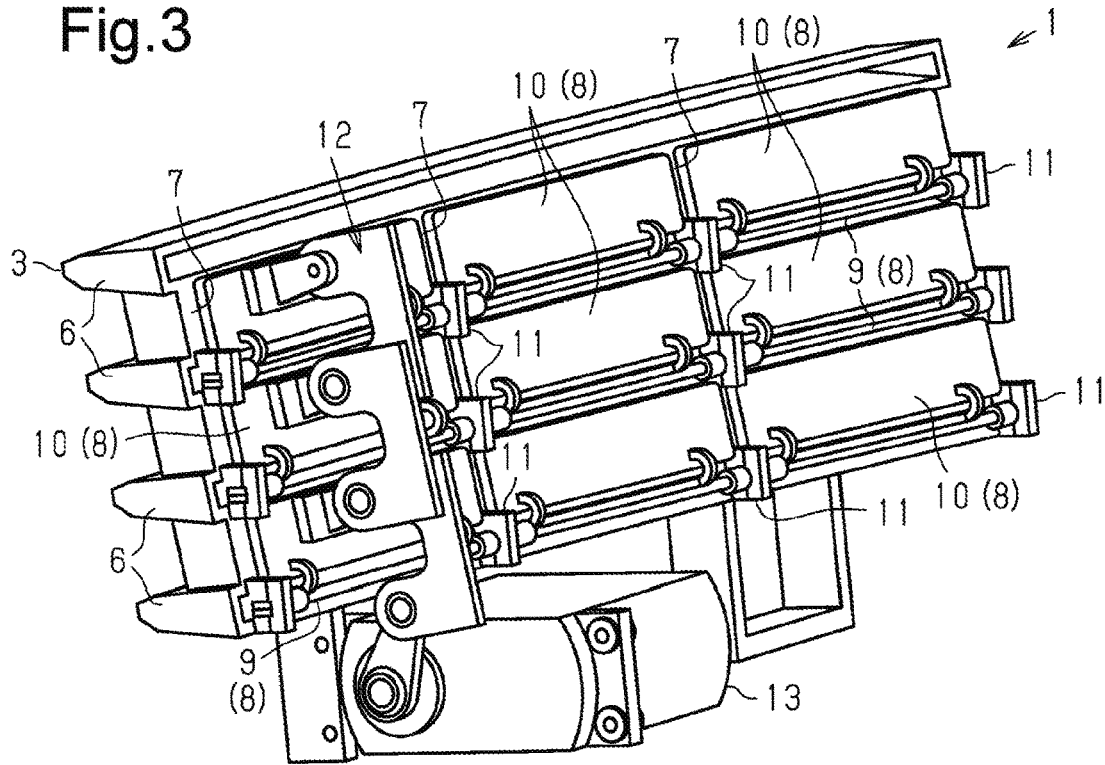
FIG. 3 is a perspective view showing the closed state of the grille shutter.

As shown in FIG. 3, the shielding plates 10 of a predetermined one of the vertical rows of the shielding plates 10 are coupled to each other by a link mechanism 12 and also coupled to a motor 13. When driven, the motor 13 causes all the opening-closing units 8 to perform the opening-closing operation integrally via the link mechanism 12. When the opening-closing operation of the opening-closing units 8 is performed, the shafts 9 are each rotated around its center line.

Figure 4:
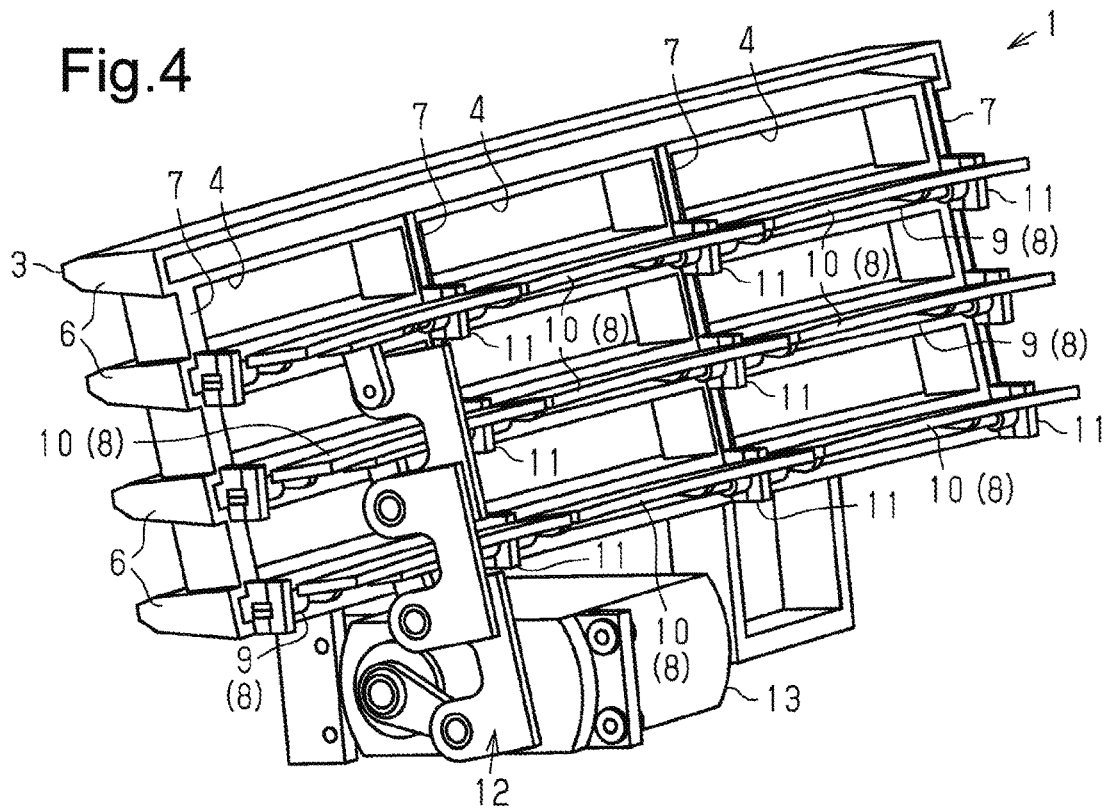
FIG. 4 is a perspective view showing an open state of the grille shutter.
Figure 5:
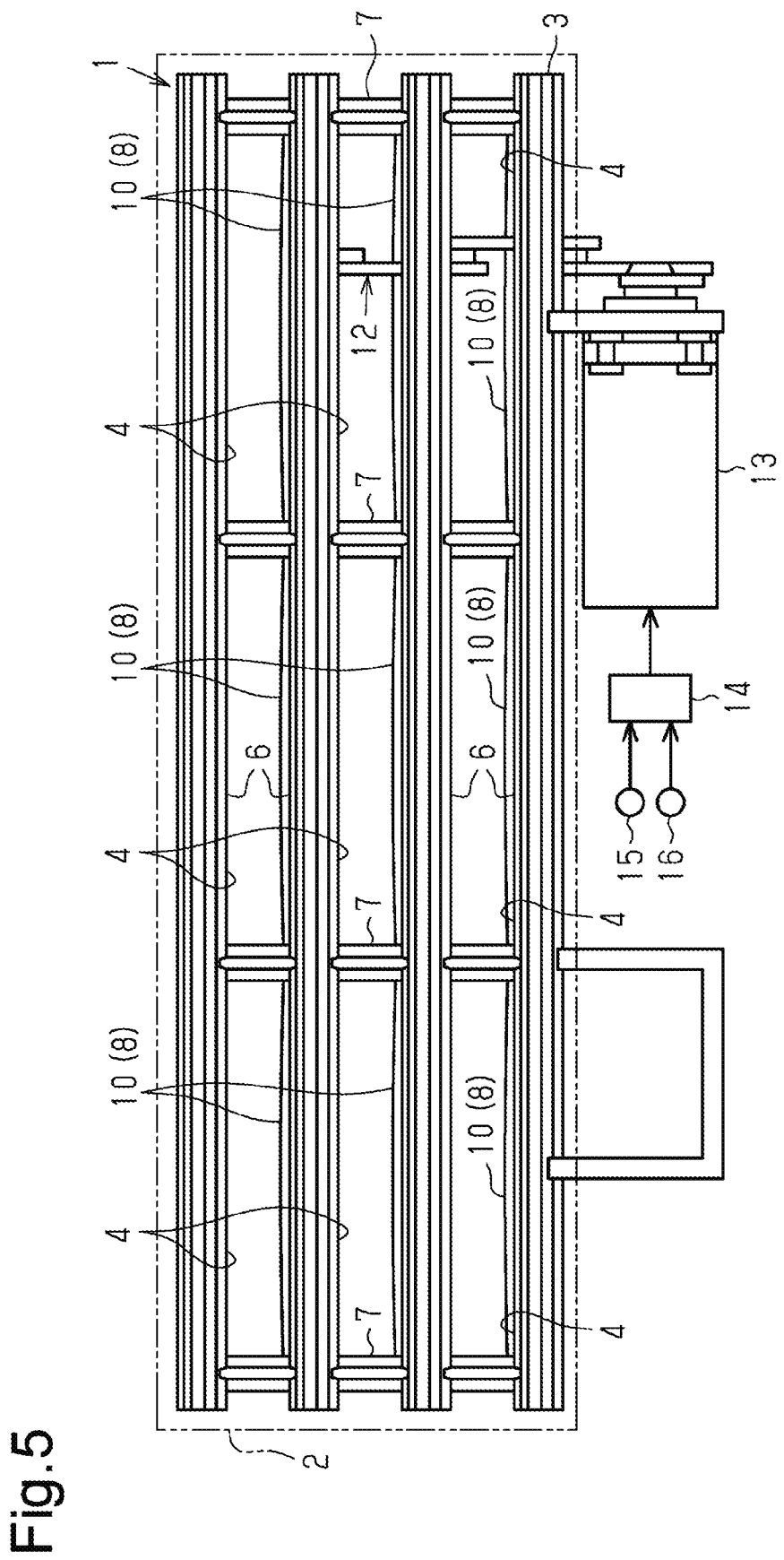
FIG. 5 is a front view showing the open state of the grille shutter.
Figure 6:
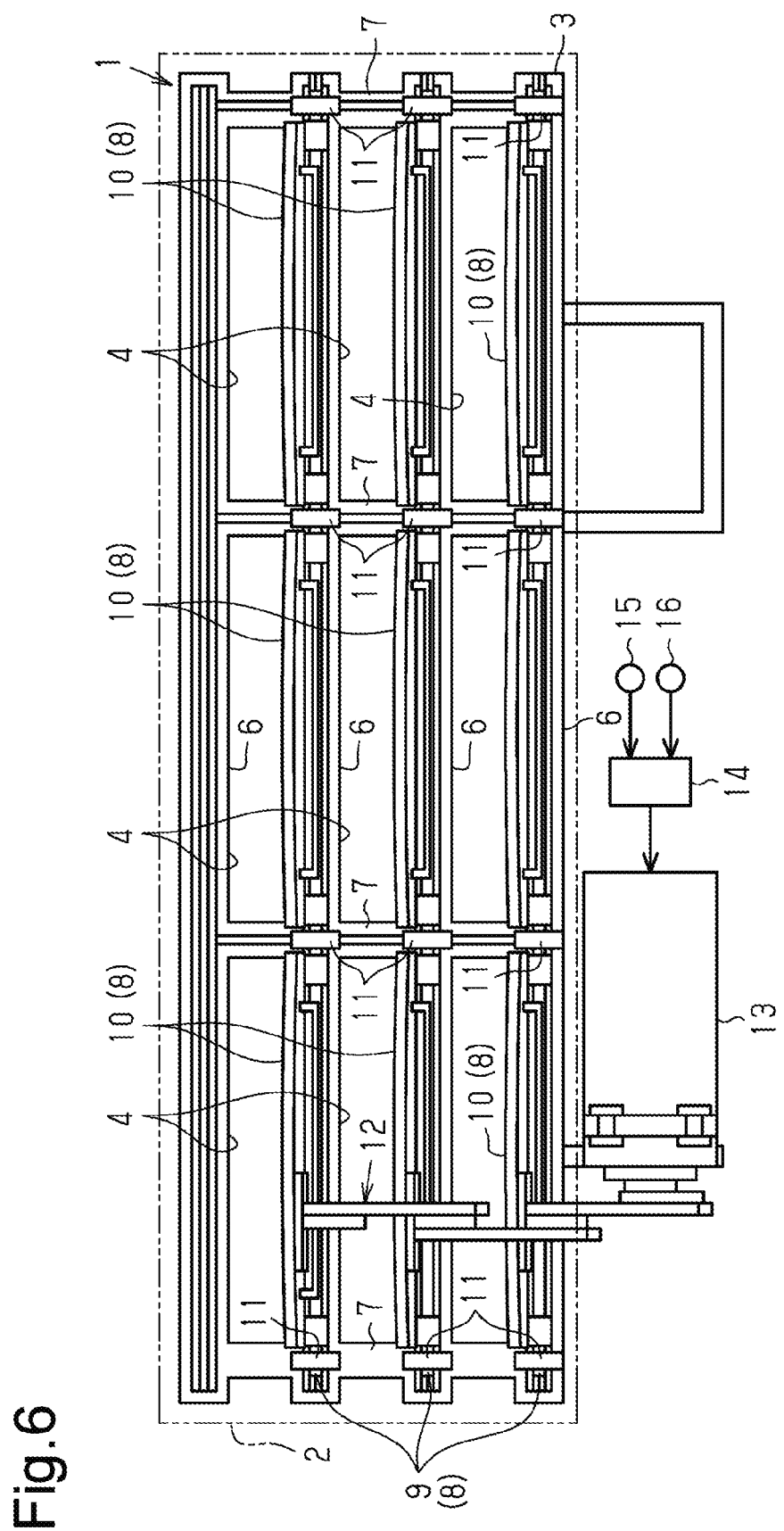
FIG. 6 is a rear view showing the open state of the grille shutter.

FIGS. 1 to 3 show a state in which the opening-closing units 8 are closed, and FIGS. 4 to 6 show a state in which the opening-closing units 8 are open. FIGS. 5 and 6 show the grille shutter 1 with the opening-closing units 8 open as viewed from the front and rear of the vehicle, respectively. The motor 13 functions as an actuator that performs the opening-closing operation of the opening-closing units 8 to open or close the outside air inlets 4 in accordance with the condition of the vehicle. The motor 13 also functions as an actuator that performs an anti-sticking operation for preventing the opening-closing units 8 from being stuck. The anti-sticking operation of the first embodiment is an opening-closing operation of the opening-closing units 8 in which the opening-closing units 8 reciprocate between the open position and the closed position one or more times, and is implemented through driving the motor 13 (actuator).

The motor 13 is controlled via a computer 14 (FIGS. 1 and 2) mounted on the vehicle. The computer 14 functions as a controlling section that controls the opening-closing operation of the opening-closing units 8. Further, the computer 14 receives detection signals from various types of sensors such as an outside air temperature sensor 15 and a raindrop sensor 16 and acquires the condition of the vehicle based on the detection signals. The computer 14 controls the motor 13 in accordance with the acquired condition of the vehicle to perform an opening-closing operation of the opening-closing units 8 such that the opening-closing state of the outside air inlets 4 is suitable for the condition of the vehicle.

Specifically, when the temperature of the outside air supplied to the radiator through the front grille 2 of the vehicle is low enough to cause excessive cooling of the radiator, the computer 14 controls the motor 13 such that the opening-closing units 8 close the outside air inlets 4. This shuts off the supply of outside air through the front grille to the radiator while the vehicle is running. When the outside air temperature is not low enough to cause excessive cooling of the radiator, the computer 14 controls the motor 13 such that the opening-closing units 8 open the outside air inlets 4. This allows the supply of outside air through the front grille to the radiator while the vehicle is running.

Further, the computer 14 controls the motor 13 such that the anti-sticking operation by the motor 13, that is, the opening-closing operation of the opening-closing units 8 is periodically performed regardless of the condition of the vehicle. Specifically, the computer 14 measures the elapsed time after the execution of the anti-sticking operation is completed in order to perform the anti-sticking operation at predetermined time intervals, and executes the anti-sticking operation when the measured elapsed time reaches a determination value. The time interval at which the anti-sticking operation is performed is determined by the determination value. The determination value may be a fixed value or a variable value that changes according to the outside air temperature and the presence or absence of rainfall.

When the determination value is a variable value, the interval between anti-sticking operations may be made shorter as the outside air temperature becomes lower by reducing the determination value as the outside air temperature becomes lower. In addition, when the determination value is a variable value, the interval between anti-sticking operations may be made shorter when there is rainfall than when there is no rainfall by reducing the determination value when there is rainfall as compared to when there is no rainfall.

The grille shutter control device according to the first embodiment has the following advantages.

(1) In the grille shutter 1, ice, mud, or the like may clog the gaps between the frame 3 and the opening-closing units 8, so that the opening-closing units 8 may be stuck open or closed. However, since the anti-sticking operation of the opening-closing units 8 by the motor 13 is periodically performed, ice, mud, or the like is discharged from between the frame 3 and the opening-closing units 8 through the anti-sticking operation. This prevents the opening-closing units 8 from being stuck open or closed.

(2) The motor 13 is used not only as an actuator that performs the opening-closing operation of the opening-closing units 8 to open or close the outside air inlets 4 in accordance with the condition of the vehicle, but also as an actuator that performs the anti-sticking operation for preventing the opening-closing units 8 from being stuck. Therefore, using the motor 13 as these actuators reduces the number of components of the control device of the grille shutter.

(3) In the grille shutter 1, the opening-closing units 8 are easily stuck due to ice, mud, or the like clogging the gaps between the shafts 9 of the opening-closing units 8 and the bearing portions 11 of the frame 3. However, periodic performance of the anti-sticking operation of the opening-closing units 8 by the motor 13, that is, the opening-closing operation of the opening-closing units 8 in which the opening-closing units 8 are reciprocated between the open position and the closed position causes the shafts 9 (opening-closing units 8) to rotate relative to the bearing portions 11 around the center lines, so as to discharge ice, mud, or the like from between the shafts 9 and the bearing portions 11. Therefore, it is possible to effectively prevent ice or mud from clogging the gaps between the shafts 9 and the bearing portions 11 of the frame 3, and consequently, the opening-closing units 8 are effectively prevented from being stuck open or closed.

(4) The interval between the anti-sticking operations is made shorter as the outside air temperature becomes lower. Thus, the anti-sticking operation is performed more frequently when the outside air temperature is low enough to cause freezing around the grille shutter. This further effectively prevents ice from clogging the gaps between the shafts 9 and the bearing portions 11.

(5) The interval between the anti-sticking operations is made shorter when there is rainfall than when there is no rainfall. Thus, the anti-sticking operation is performed frequently when mud splash is likely to occur around the grille shutter due to rainfall. This further effectively prevents mud from clogging the gaps between the shafts 9 and the bearing portions 11.

Second Embodiment

A grille shutter control device according to a second embodiment will now be described with reference to FIG. 7.

In the second embodiment, the motor 13 is used as an actuator that performs the opening-closing operation of the opening-closing units 8 in accordance with the condition of the vehicle. In addition, the second embodiment includes an additional actuator that performs an anti-sticking operation.

Figure 7:
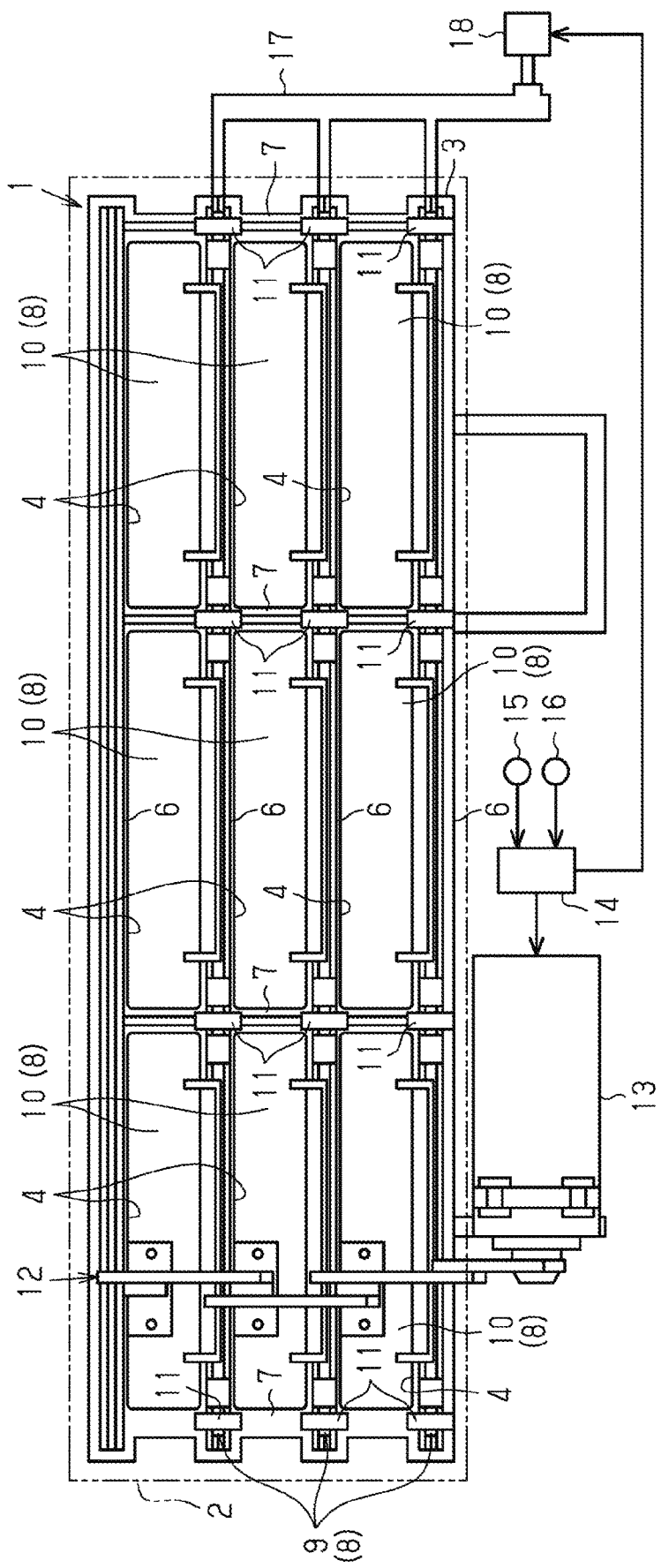
FIG. 7 is a rear view showing a grille shutter according to a second embodiment.

Each of the shafts 9 shown in FIG. 7 is supported by the corresponding bearing portions 11 of the frame 3 so as to be displaceable in the axial direction. The right ends in FIG. 7 of the shafts 9 are coupled to a linear solenoid 18 via a coupler 17. As the anti-sticking operation, the linear solenoid 18 integrally displaces the shafts 9 in the axial direction with respect to the bearing portions 11 of the frame 3, and functions as an actuator for performing such an anti-sticking operation. Such an anti-sticking operation is implemented by reciprocating the shafts 9 between one side and the other side in the axial direction one or more times.

In addition to the advantages (1), (4), and (5) of the first embodiment, the second embodiment achieves the following advantage.

(6) The periodic anti-sticking operation of the opening-closing units 8 by the linear solenoid 18, that is, the axial displacement of the shafts 9 relative to the bearing portions 11 effectively prevents the opening-closing units 8 from being stuck due to ice or mud clogging the gaps between the shafts 9 and the bearing portions 1. Specifically, when the shafts 9 move relative to the bearing portions 11 in the axial direction through the anti-sticking operation, ice, mud, or the like is discharged from between the shafts 9 and the bearing portions 11. Therefore, it is possible to effectively prevent ice or mud from clogging the gaps between the shafts 9 and the bearing portions 11 of the frame 3, and consequently, the opening-closing units 8 are effectively prevented from being stuck open or closed.

Third Embodiment

A grille shutter control device according to a third embodiment will now be described with reference to FIG. 8.

Figure 8:
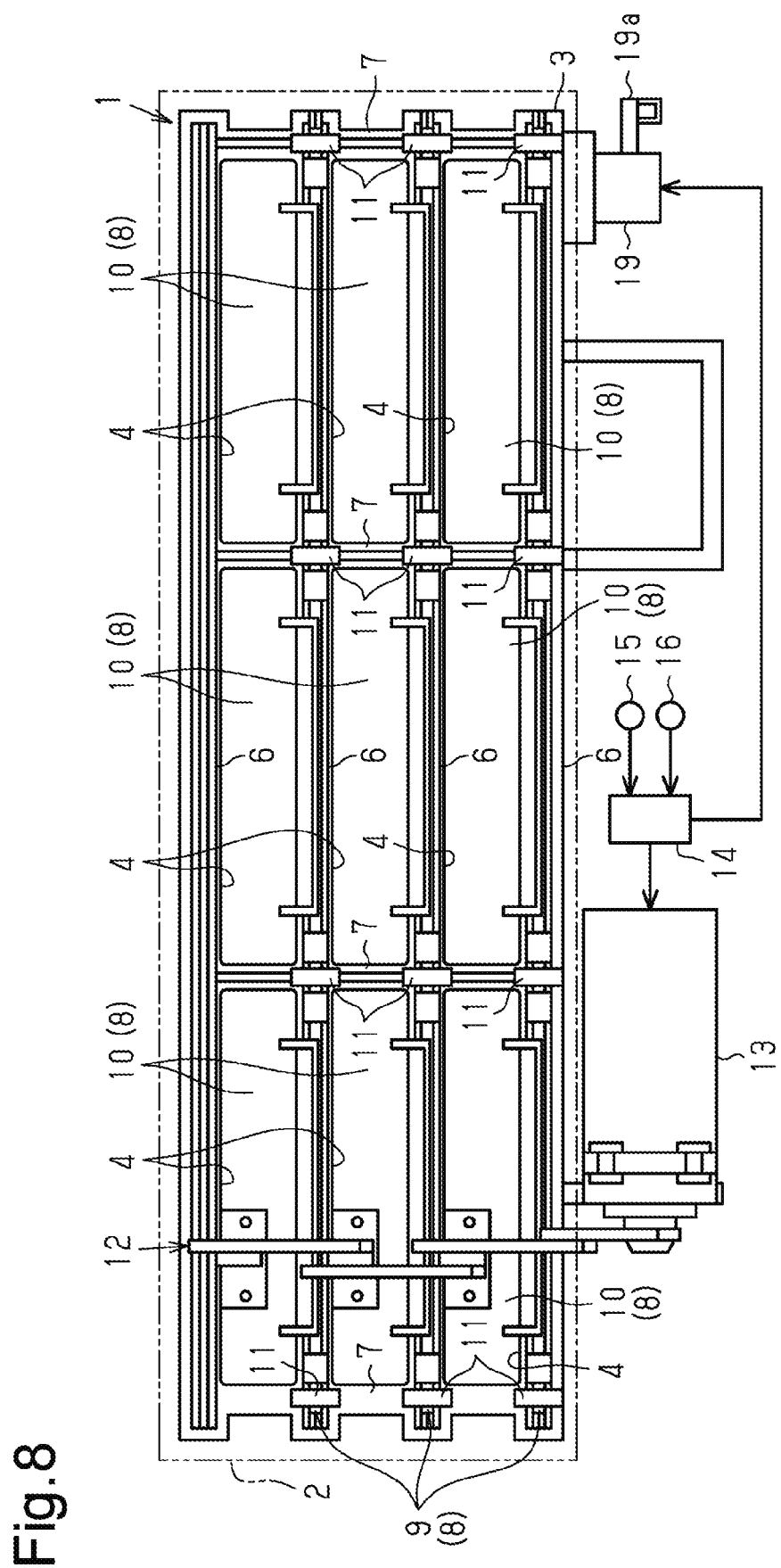
FIG. 8 is a rear view showing a grille shutter according to a third embodiment.

As shown in FIG. 8, in the third embodiment, instead of providing the linear solenoid 18 as in the second embodiment, a vibration motor 19 that applies vibration to the frame 3 is provided. The vibration motor 19 functions as an actuator for performing an anti-sticking operation, and applies vibration to the frame 3 by rotating an eccentric shaft 19a, which is in contact with the frame 3.

In addition to the advantages (1), (4), and (5) of the first embodiment, the third embodiment achieves the following advantages.

(7) The periodic performance of the anti-sticking operation of the opening-closing units 8 by the vibration motor 19, that is, application of vibration to the frame 3 discharges ice, mud, or the like from between the opening-closing units 8 and the frame 3. Therefore, it is possible to effectively prevent ice, mud, or the like from clogging the gaps between the opening-closing units 8 and the frame 3, thereby preventing the opening-closing units 8 from being stuck open or closed.

(8) The periodic anti-sticking operation of the opening-closing units 8 by the vibration motor 19, that is, the application of vibration to the frame 3 effectively prevents the opening-closing units 8 from being stuck due to ice or mud clogging the gaps between the shafts 9 of the opening-closing units 8 and the bearing portions 11 of the frame 3. Specifically, when vibration is applied to the frame 3 through the anti-sticking operation, ice, mud, or the like is discharged from between the shafts 9 and the bearing portions 11. Therefore, it is possible to effectively prevent ice or mud from clogging the gaps between the shafts 9 and the bearing portions 11 of the frame 3, and consequently, the opening-closing units 8 are effectively prevented from being stuck open or closed.

Other Embodiments

The above-described embodiments may be modified as follows.

The travel distance of the vehicle after completion of the execution of the anti-sticking operation may be measured, the anti-sticking operation may be performed when the measured travel distance reaches a determination value, so that the anti-sticking operation is performed periodically.

At least two of the first, second, and third embodiments may be combined.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A grille shutter control device employed for a grille shutter, wherein the grille shutter includes a frame, which has an outside air inlet, and an opening-closing unit for opening and closing the outside air inlet, the frame being configured to be provided in a front grille of a vehicle, wherein the grille shutter control device controls an opening-closing operation of the opening-closing unit such that the outside air inlet is opened or closed in accordance with a condition of the vehicle, the condition of the vehicle corresponding to a vehicle's ambient weather and an outside air temperature, the grille shutter control device comprising:
   an actuator that performs an anti-sticking operation for preventing the opening-closing unit from being stuck; and
   a controlling section that controls the actuator such that the anti-sticking operation is periodically performed by the actuator, wherein
   the actuator is configured to perform the opening-closing operation of the opening-closing unit, the controlling section is configured to, through control of the actuator,
- perform the opening-closing operation of the opening-closing unit such that the outside air inlet is opened or closed in accordance with the condition of the vehicle, and
- periodically perform, as the anti-sticking operation, the opening-closing operation of the opening-closing unit regardless of the condition of the vehicle, the controlling section is configured to, in order to periodically perform the anti-sticking operation regardless of the condition of the vehicle,
- measure an elapsed time after an execution of the anti-sticking operation is completed, and
- execute the anti-sticking operation when the measured elapsed time reaches a determination value, and the determination value is a variable value and becomes smaller when there is rainfall than when there is no rainfall.

2. The grille shutter control device according to claim 1, wherein
the frame includes a bearing portion,
the opening-closing unit includes a shaft rotationally supported by the bearing portion and performs the opening-closing operation by rotating around a center line of the shaft, and
the actuator is a motor that rotates the opening-closing unit about the center line of the shaft.

3. The grille shutter control device according to claim 1, wherein
the frame includes a bearing portion,
the opening-closing unit includes a shaft rotationally supported by the bearing portion and performs the opening-closing operation by rotating around a center line of the shaft, and
the actuator is a linear solenoid that performs the anti-sticking operation by displacing the shaft in an axial direction relative to the bearing portion.

4. The grille shutter control device according to claim 1, wherein
the opening-closing unit is attached to the frame, and
the actuator is a vibration motor that performs the anti-sticking operation by applying vibration to the frame.

5. The grille shutter control device according to claim 4, wherein
the frame includes a bearing portion, and
the opening-closing unit includes a shaft rotationally supported by the bearing portion and performs the opening-closing operation by rotating around a center line of the shaft.

6. The grille shutter control device according to claim 1, wherein the determination value becomes smaller as the outside air temperature becomes lower.

* * * * *